United States Patent [19]

Murakami et al.

[11] Patent Number: 4,839,667

[45] Date of Patent: Jun. 13, 1989

[54] PLATEN FOR USE IN THERMAL PRINTER

[75] Inventors: Sadatoshi Murakami; Satoru Yamasaki; Masayuki Tanaka; Sayoko Hirata; Hiromi Morimoto, all of Fukuyama; Kenji Nomura, Amagasaki; Kenichiro Oka; Masaru Ohnishi, both of Kamakura, all of Japan

[73] Assignee: Mitsubishi Denki Kabushiki Kaisha, Tokyo, Japan

[21] Appl. No.: 114,607

[22] Filed: Oct. 30, 1987

[30] Foreign Application Priority Data

Oct. 31, 1986 [JP] Japan ............................... 61-261203

[51] Int. Cl.$^4$ ............................................ G01D 15/10

[52] U.S. Cl. ................................ 346/76 PH; 400/662

[58] Field of Search .................... 346/76 PH; 400/662, 400/648, 656, 658, 659, 661.1, 661.4

[56] References Cited

U.S. PATENT DOCUMENTS

| | | | |
|---|---|---|---|
| 4,399,749 | 8/1983 | Arai . | |
| 4,725,853 | 2/1988 | Kobayashi et al. | 346/76 PH |

FOREIGN PATENT DOCUMENTS

| | | | |
|---|---|---|---|
| 0004483 | 1/1981 | Japan | 400/662 |
| 0004484 | 1/1981 | Japan | 400/662 |
| 56-123877 | 9/1981 | Japan . | |
| 0162672 | 8/1985 | Japan | 400/662 |
| 0196374 | 10/1985 | Japan | 400/662 |
| 3406836 | 8/1984 | Netherlands | 400/662 |

*Primary Examiner*—C. L. Albritton
*Assistant Examiner*—Huan H. Tran
*Attorney, Agent, or Firm*—Birch, Stewart, Kolasch & Birch

[57] ABSTRACT

A platen for use in thermal printer of a type designed to effect a printing with the use of at least one thermal print head for printing on a recording medium positioned between the platen and the thermal print head, which platen comprises a generally elongated elastic body having an exterior surface adapted to be brought into contact with the heating elements of the thermal print head assembly with at least the recording medium intervening therebetween, and a layer of porous material lined on the exterior surface of the elastic body and having a hardness greater than that of the elastic body and also having a thermal conductivity lower than that of the elastic body. The thermal conductivity and the porosity of the layer of porous material may be within the range of 0.05 to 0.10 Kcal/m$^2$·hr·°C. and within the range of 50 to 95%, respectively.

6 Claims, 2 Drawing Sheets

PLATEN FOR USE IN THERMAL PRINTER

CROSS-REFERENCE TO THE RELATED APPLICATION

United States Patent Application entiled "Platen For Use In Thermal Printer", executed Oct. 12, 1987, and filed on Oct. 30, 1987, and assigned U.S. Ser. No. 114,838 and in the name of Sadatoshi MURAKAMI, Satoru YAMASAKI, Kenji NOMURA. Masayuki TANAKA, Kenichiro OKA, Masaru OHNISHI and Sayoko HIRATA, claiming the Convention priority to the Japanese Patent Application No. 61-261202 which had been filed by the same assignee of the present invention on Oct. 31, 1986.

BACKGROUND OF THE INVENTION

1. Field of the Invention

The present invention relates to a thermal printer of a type designed to effect a printing with the use of at least one thermal print head for printing on a recording medium and, more particularly, to a platen used in the thermal printer.

2. Description of the Prior Art

With the advent of the age of widespread use of computers, particularly personal computers, the use of thermal printers or dot matrix printers is currently increasing as a computer output device that provides a hard copy of a text. For example, U. S. Pat. No. 4,399,749, issued Aug. 23, 1983, discloses a thermal printer of a type comprising a thermal print head assembly including a row of print heads for printing indicia of different colors by transferring color ink from an ink carrier medium onto a recording medium while the latter is intermittently fed around a cylindrical platen laid parallel to the longitudinal direction of the row of the print heads. The thermal printer disclosed in this publication does not require the use of a movable carriage for the support of the thermal print head assembly as the row of the print heads extends a distance substantially equal to the length of the cylindrical platen. Instead, the plural print heads forming the print heads assembly area adapted to be sequentially energized to complete the printing of each line of indicia while the cylindrical platen is intermittently driven to feed the recording medium a distance corresponding to a required line spacing between the neighboring lines of indicia each time the line of indicia has been printed.

In any event, the above mentioned U.S. patent is merely illustrative of the prior art thermal printer, and the thermal printer utilizing a single print head mounted on the movable carriage for movement together therewith so as to traverse the recording medium in a direction lengthwise of the cylindrical platen is also well known.

In general, the cylindrical platen used in most prior art thermal printers is of such a construction as shown in FIGS. 5 and 6 of the accompanying drawings and is disclosed in, for example, the Japanese Laid-open Patent Publication No. 56-123877 published in 1981. As shown therein, the cylindrical platen generally identified by 1 comprises a support shaft 2 having a tubular elastic layer 3 rigidly mounted on the support shaft 2, said tubular elastic layer 3 being made of, for example, natural or synthetic rubber or any other suitable synthetic elastomer. This cylindrical platen 1 is generally used to support the recording medium 6 turned around the cylindrical platen 1. On one side of the recording medium 6 opposite to the cylindrical platen 1 and between the recording medium 6 and a thermal print head 10 having a plurality of heating elements 10*a* and mounted on a movable carriage, a length of ink carrier ribbon 7 reeled at one end to a ribbon supply reel and secured at the other end to a ribbon take-up reel extends in a direction generally parallel to the longitudinal sense of the cylindrical platen 1.

As is well known to those skilled in the art, the ink carrier ribbon 7 comprises a strip of heat-resistant base film 8 having one surface confronting the recording medium 6 formed with a layer of thermally fusible ink 9 substantially over the entire length of the strip of base film 8. In practice, the thermal print head 10 is mounted on the movable carriage for movement together therewith and is supported for pivotal movement between printing and inoperative positions in a direction towards and away from the recording medium 6. During the actual printing, the thermal print head 10 is pivoted to and maintained at the printing position until the movable carriage completes its travel from one end of the cylindrcal platen 1 to or towards the opposite end thereof to complete the printing of each line of indicia.

The manner in which the printing, that is, the transfer of thermally fusible ink from the ink carrier ribbon 7 onto the recording medium 6 is best shown in FIG. 5. Assuming that the thermal head assembly 10 is pivoted to the printing position at which a portion of the ink carrier ribbon 7 is pressed against the cylindrical platen 1 with the intervention of the recording medium 6 therebetween as shown and an electric character signal descriptive of one alphanumeric character is then applied to the thermal print head 10 , some or all of the heating elements 10*a* are electrically energized to generate heat. With this heat, a portion 9*a* of the ink layer 9 on the strip of base film 8 which is then aligned with the heated heating elements 10*a* is thermally fused and then transferred onto the recording medium 6 after having separated from the strip of base film 8. That portion 9*a* of the ink layer 9 on the strip of base film 8 which has been transferred onto and fixed on the recording medium 6 forms a portion of the alphanumeric character represented by the applied character signal.

In order for a particular indicium to be printed clearly on the recording medium 6, it is necessary for the heating elements 10*a* to be held in contact with the surface of the recording medium 6 under uniform pressure. For this purpose, the elastic layer 3 forming a part of the platen 1 is desirably of a type having a rubber hardness of HS 55 degrees or greater as defined according to the Japanese Industrial Standards.

On the other hand, to accomplish a high speed printing for a given speed of movement of the thermal print heat assembly, is necessary to facilitate a ready thermal fusion of each portion of the ink layer 9 which is successively aligned with the energized heating elements 10*a* of the print heat assembly 10. This may be accomplished by efficiently transferring Joule heat generated from the energized heating elements 10*a* to that portion of the ink layer 9 through the strip of base film 8 and, at the same time, minimizing the dissipation of the transferred heat through the platen 1. The dissipation of the heat so transferred from the energized heating elements 10*a* may be minimized if the elastic layer 3 has a relatively low thermal conductivity.

Hitherto, in order for the platen 1 to have the elastic layer 3 of low thermal conductivity, the elastic layer 3 is generally made of a foamed rubber material or a foamed synthetic resin having a heat retaining capability. The heat retaining capability of the foamed material for the elastic layer 3 permits reduction in thermal conductivity of such material and, therefore, absorption by the elastic layer 3 of the Joule heat generated from the electrically energized heating elements 10*a* of the thermal print heat assembly 10 could be advantageously retarded while permitting the Joule heat to be extensively used to fuse that portion of the ink layer 8 of the ink carrier ribbon 7 for the quick transference onto the recording medium 6.

However, it has been found that the use of the foamed material for the elastic layer 3 of the cylindrical platen 1 poses a problem in that, as shown in FIG. 8 in a cross-sectional representation of the cylindrical platen 1 in relation to the thermal print head assembly 10, the actual use of the cylindrical platen 1 for a substantial period of time results in the permanent formation of indentations 3*a* left by the heating elements 10*a* on the outer peripheral surface of the tubular elastic layer 3. The presence of these indentations 3*a* on the outer peripheral surface of the tubular elastic layer 3 hampers the uniform contact of the heating elements 10*a* of the thermal print head assembly 10 with the recording medium 6 through the ink carrier ribbon 7 and, therefore, some or all of the indicia to be printed tend to be printed in broken fashion lacking clarity. This in turn results in reduction of the printing quality.

In order to avoid the above discussed problem, it may be suggested that the elastic layer 3 should be made of a hard material having a low thermal conductivity. However, it has been found extremely difficult to manufacture the elastic layer 3 of hard material with the use of a single mold assembly.

By way of example, an attempt to make the whole elastic layer 3 out of hard material would result in elimination of a soft under layer, with the consequence that the heating elements 10*a* of the head assembly 10 must be pressed onto to elastic layer 3 with great pressing force with the recording medium 6 intervened therebetween. This results in the transportation of the recording medium 6 being adversely affected. For example, the medium 8 is unexpectedly shifted while being transported. Also acceleration in abrasion of the heating elements 10*a* results. Because of the great volume of the hole elastic layer 3, the layer 3 would also inevitably have a non-uniform porosity throughout resulting in the thermal conductivity varying throughout out the layer 3 depending on the non-uniformity or the porosity.

Conversely, an attempt to reduce the thermal conductivity of the elastic layer 3 would result in an increase in the porosity accompanied by an increase in size of each hole (porosity), with the consequence that roughness of the surface of the elastic layer 3 is increased and distribution of hardness becomes non-uniform throughout the elastic layer 3. For example, where the large hole exists, hardness therein becomes small. Therefore, the suggested use of the hard material for the elastic layer 3 would not alleviate the occurence of the printing of indicia in broken fashion and, hence, the reduction of the printing quality. Also, the use of the elastic layer 3 made of the hard material could not cope with the requirements necessary to be accomplished for the achievement of the high speed printing.

As an alternative to the cylindrical platen 1 show in and described with particular reference to FIG. 6, a band-shaped platen 1*a* made of a metal strip 4 having one surface lined with an elastic layer 5 is also well known as shown in FIG. 7. So far as the elastic layer 5 is made of the same material as that in the cylindrical platen 1, the band-shaped platen 1*a* remains having problems similar to those discussed in connection with the cylindrical platen 1.

SUMMARY OF THE INVENTION

Therefore, the present invention has been devised with a wiew to substantially eliminating the above discussed problems inherent in the prior art platens used in the thermal printers and has for its primary object to provide an improved platen effectively utilizable to produce a print-out of a high printing quality at high printing speed.

To this end, the present invention provides an improved platen for use in a thermal printer which comprises a generally elongated elastic body having an exterior surface adapted to be brought into contact with the heating elements of the thermal print head assembly with the recording medium intervening therebetween, said exterior surface of the generally elongated elastic body being lined with a layer of porous material having a low thermal conductivity.

According to the present invention, the elastic body need neither be made of a porous material nor have a low thermal conductivity such as exhibited by the porous material. Moreover, the layer of porous material having the low thermal conductivity and forming an outer covering on the elongated elastic body may be reduced in thickness and, therefore, can be formed of a hard material.

Thus, since the platen has its outer surface covered with the layer of porous material having the low thermal conductivity, the Joule heat generated by the heating elements of the thermal print head assembly will hardly be assorbed in the platen through the recording medium and can be rather concentrated on the ink carrier ribbon to facilitate the quick fusion of a portion of the ink layer on the ink carrier ribbon for the subsequent transference onto the recording medium. Therefore, given the type of the ink carrier ribbon and the speed of movement of the thermal print head assembly, a high speed printing is possible with the use of the platen according to the present invention.

Moreover, since the exterior surface of the elongated elastic body forming a part of the platen is lined with the hard material, the possibility of formation of indentations which would otherwise take place on the outer surface of the platen under the influence of a pressing force exerted by the thermal print heat assembly during the continued use for a substantial lenght of time can be advantageously minimized. This substantially eliminates the possible occurrence of the printing in borken fashion lacking clarity while ensuring a uniform contact pressure between the recording medium and the ink carrier ribbon urged by the heating elements of the thermal print head assembly, thereby to accomplish a high quality printing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In any event, the present invention will become more clearly understood from the following description of preferred embodiment thereof, when taken in conjunction with the accompanying drawings. However, the embodiments and the drawings are given only for the purpose of illustration and explanation, and are not to be taken as limiting the scope of the present invention in any way whatsoever, which scope is to be determined solely by the appended claims. In the drawings, like reference numerals denote like parts in the several views, and:

DETAILED DESCRIPTION OF THE EMBODIMENTS

Figure 1:
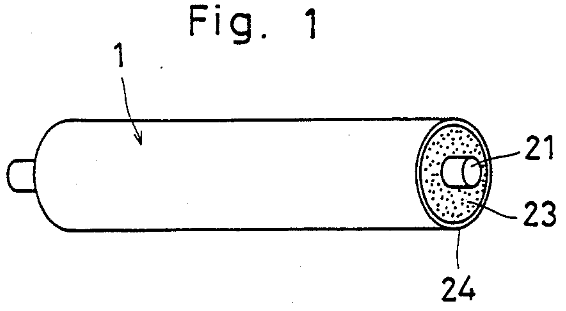
FIGS. 1 and 2 are schematic perspective views of a cylindrical platen according to first and second preferred embodiments of the present invention, respectively.

Referring first to FIG. 1 showing a first preferred embodiment of the present invention, a platen for use in a thermal printer of a type designed to effect a printing with the use of at least one thermal print head for transferring a thermally transferable ink from an ink carrier ribbon onto a recording medium, generally identified by 1, comprises a support shaft 21 having a substantial length, a tubular elastic body 23 mounted rigidly on the support shaft 21 in coaxial relationship and a tubular porous layer 24 mounted exteriorly on the tubular elastic body 23 and bonded by the use of any suitable bonding agent or a fusion bonding technique on the outer peripheral surface of the tubular elastic body 23. The tubular porous layer 24 has a hardness greater than that of the tubular elastic body 23 and also has a thermal conductivity lower than that of the tubular elastic body 23.

The tubular elastic body 23 may be made of any known material, for example, rubber, synthetic resin or a foamed material thereof as is the case with the prior art platen and has a rubber handness within the range of HS 35 to 55 degrees as defined according to the Japanese Industrial Standards (JIS).

The tubular porous layer 24 is made of organic foamed film of, for example, rubber or synthetic resin, having a thickness of, for example, 0.1 to 2.0 mm and has a rubber hardness preferably within the range of 55 to 95 degrees as defined according to the Japanese Industrial Standards and also has a thermal conductivity within the range of 0.05 to 0.10 Kcal/m$^2$·hr·°C. The synthetic resing which may be used as the material for the tubular porous layer 24 may be selected from the group consisting of fluorine-contained resin, polypropylene and polyethylene, having a porosity within the range of 50 to 80% and also having a pore size of about 1 82 m.

Alternatively, the tubular porous layer 24 may be made of, for example, a web of organic or inorganic fibrous sheet having JIS rubber hardness of HS 55 degrees or greater and also having a thermal conductivity within the range of 0.04 to 0.09 Kcal/m$^2$·hr·°C. In this case, the inorganic fibrous sheet may be the one made of fibers of potassium titanate (K20·nTiO2), asbestos, mulite, vermiculite and pearlite, having a porosity within the range of 60 to 90% and also having a fiber size, that is, a pore size, of about 1 μm.

As hereinbefore described, according to the present invention, the tubular elastic body 23 itself need neither be made of a porous material nor have a low thermal conductivity such as exhibited by the porous material. Moreover, the tubular porous layer 24 exteriorly sorrounding the tubular elastic body 23 and having the low thermal conductivity may have a reduced thickness and, therefore, can be formed of a hard material.

Thus, since the platen 1 has its outer surface covered with the tubular porous player 24 having the low thermal conductivity, the Joule heat generated by the heating elements 10*a* of the thermal printer head assembly 10 will hardly be absorbed in the platen 1 through the recording medium 6 and can be rather concentrated on the ink carrier ribbon 7 to facilitate the quick fusion of a portion 9*a* of the ink layer 9 on the ink carrier ribbon 7 for the subsequent transference onto the recording medium 6. Therefore, given the type of the ink carrier ribbon 7 and the speed of movement of the thermal print head assembly 10, a high speed printing is possible with the use of the platen 1 of the construction according to the present invention.

Moreover, since the exterior surface of the tubular elastic body 23 forming a part of the platen 1 is lined with the hard material, the possibility of formation of indentations which would otherwise take place on the outer surface of the platen under the influence of a pressing force exerted by the thermal print head assembly 10 during the continued use for a substantial lenght of time can be advantageously minimized. This substantially eliminates the possible occurrence of the printing in broken fashion lacking clarity while ensuring a uniform contact pressure between the recording medium 6 and the ink carrier ribbon 7 urged by the heating elements 10*a* of the thermal print head assembly 10, thereby to accomplish a high quality printing.

In the foregoing description the elastic body 23 has been shown and described as a tubular solid body. However, in place of the tubular elastic body 23, a roll of foamed film made of hard synthetic resin may be employed as shown by 22 in FIG. 2. This foamed-film roll 22 can be formed by spirally winding a web of the foamed film around the support shaft 21.

Figure 2:
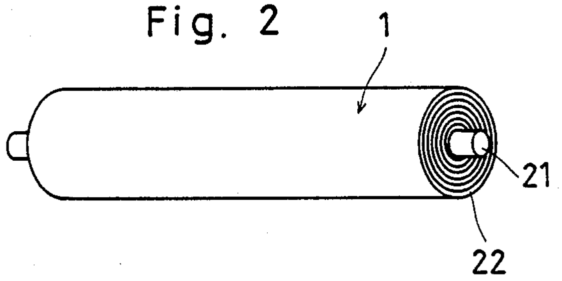

Specifically, referring to FIG. 2, the foamed film used to form the foamed-film roll 22 may be an organic foamed film of, for example, rubber or synthetic resin having a JIS rubber hardness within the range of HS 55 to 95 degrees and also having a thermal conductivity within the range of 0.05 to 0.10 Kcal/m$^2$·hr·°C. The synthetic resin which may be used as a material for the foamed film may be selected from the group consisting of fluorine-contained resin, polypropylene and polyethylene, having a porosity within the range of 50 to 80% and a pore size of about 1 μm.

The application of the concept of the present invention is not limited to the cylindrical platen such as shown in and described with reference to any one of FIGS. 1 and 2, by can extend to generally band-shaped platen such as shown in any one of FIGS. 3 and 4.

Figure 3:
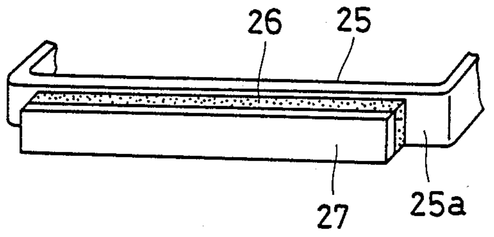
FIGS. 3 and 4 are schematic perspective views of a generally band-shaped platen according to third and fourth preferred embodiments of the present invention, respectively.

Referring now to FIG. 3, the band-shaped platen generally identified by 25 comprises a generally U-shaped metal strip 25a supported at its opposite ends by a printer skeleton (not shown) so as to have a generally intermediate portion thereof extending parallel to the direction of movement of the carriage on which the thermal print head assembly 10 is mounted. A generally strip/like elastic body 26 of the same material as that for the tubular elastic body 23 described in connection with the embodiment of FIG. 1 is bonded, for otherwise secured in any suitable manner, to the generally intermediate portion of the metal strip 25a, and a generally strip-like porous layer 27 of the same material as that for the tubular porous layer 24 described in connection with the embodiment of FIG. 1 is bonded, or otherwise secured in any suitable manner, to one surface of the strip-like elastic body 26 opposite to the metal strip 25a.

Figure 4:
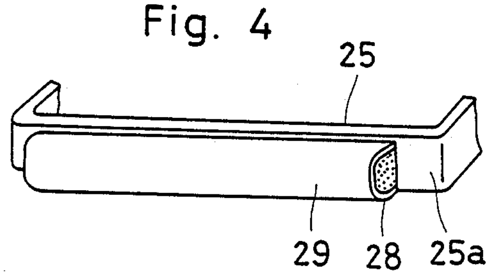
Figure 5:
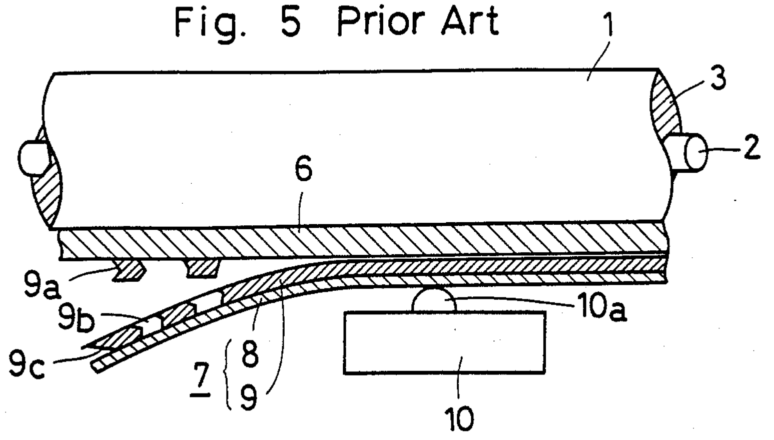
Fig. 5 Prior Art
FIG. 5 is a fragmentary top plan view showing the principle of thermal transfer printing performed by the prior art thermal printer with recording and ink carrier media exaggerated relative to the cylindrical platen.
Figure 6:
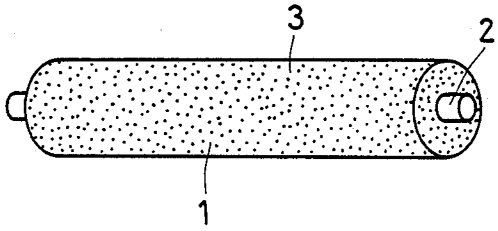
Fig. 6 Prior Art
FIGS. 6 and 7 are schematic perspective views of the prior art cylindrical and band-shaped platens, respectively.
Figure 7:
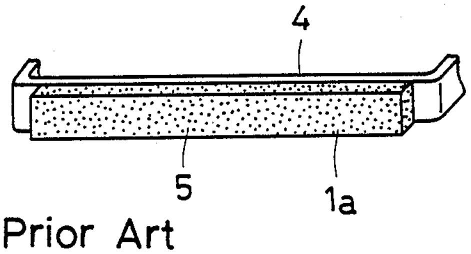
Fig. 7 Prior Art
Figure 8:
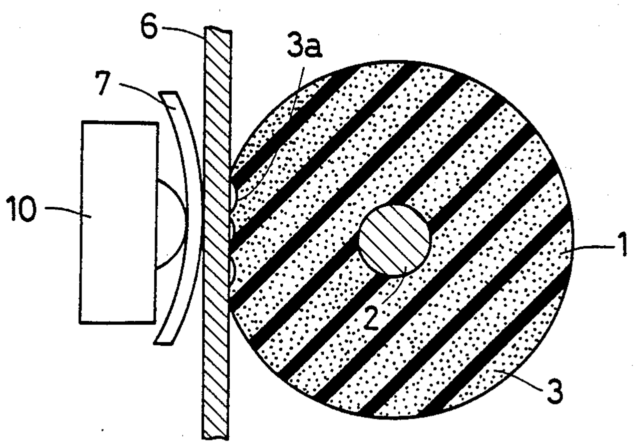
Fig. 8 Prior Art
FIG. 8 is a schematic cross-sectional representation of the prior art cylindrical platen showing the manner in which identations are formed on the outer peripheral surface of the platen.

The band-shaped platen 25 according to the embodiment shown in FIG. 4 is similar to that according to the embodiment of FIG. 3, except for only the difference residing in that the strip-like elastic body 28 shown in FIG. 4 is of a generally semi-circular cross-section and, accordingly, the porous layer 29 of the same material as that for the porous layer 27 shown in FIG. 3 is applied to the semi-circular cross-sectioned elastic body 28 so as to cover the curved surface thereof.

From the foregoing description of the present invention, it has now become clear that, since the platen for use in the thermal printer comprises a generally elongated elastic body having an exterior surface adapted to be brought into contact with the heating elements of the thermal print head assembly with the ink carrier ribbon and the recording medium intervening therebetween, said exterior surface of the generally elongated elastic body being lined with a layer of porous material having a low thermal conductivity, a high quality print-out can be obtained with high speed printing.

Although the present invention has fully been described in connection with the preferred embodiments thereof with reference to the accompanying drawings used only for the purpose of illustration, those skilled in the art will readilly conceive numerous changes and modifications within the framework of obviousness upon the reading of the specification herein presented of the present invention. For example, the platen herein disclosed for the purpose of the present invention can satisfactory and effectively work with the recording medium of a type which, when heated, develops visible images, that is, a thermo-sensitive paper. Even where the thermo-sensitive paper is used in association with the thermal printer utilizing the platen according to the present invention, similar effects to those described in connection with the illustrated embodiments of the present invention can be appreciated. Of course, the use of the thermo-sensitive paper does not requiere the use of the ink carrier ribbon.

Accordingly, such changes and modifications are, unless they depart from the spirit and scope of the present invention as delivered from the claims annexed hereto, to be construed as included therein.

What is claimed is:

1. A platen for use in a thermal printer of a type designed to effect a printing with the use of a least one thermal print head for printing a recording medium positioned between the platen and the thermal print head, which platen comprises a generally elongated elastic body having an exterior surface adapted to be brought into contact with the heating elements of the thermal print head assembly with at least the recording medium intervening therebetween, said exterior surface of the generally elongated elastic body being lined with a layer of porous material having a hardness greater than that of the elastic body and also having a thermal conductivity lower than that of the elastic body, said elastic body being made of a material selected from the group consisting of rubber, synthetic resin and foamed material.

2. The platen as claimed in claim 1, wherein the thermal conductivity of the layer of porous material is within the range of 0.05 to 0.10 Kcal/m$^2$·hr·°C.

3. The platen as claimed in claim 1, wherein the layer of porous material has a porosity within the range of 50 to 95%.

4. The platen as claimed in claim 1, wherein the layer of porous material has a rubber handness within the range of HS 55 to 95 degrees as defined according to the Japanese Industrial Standards.

5. The platen as claimed in claim 1, wherein the elastic body has a rubber hardness within the range of HS 35 to 55 degrees as defined according to the Japanese Industrial Standards and wherein said layer of porous material is rigidly secured to an outer surface of the elastic boby.

6. The platen as claimed in claim 1, wherein the layer of porous material is made of a film of one or a mixture of porous synthetic resin selected from the group consisting of fluorine-contained resin, polypropylene, polyethylene and aromatic polyamide, foamed rubber material and a web of sheet material made of inorganic or organic fibers.

* * * * *